United States Patent
Al-Amri (10) Patent No.: US 10,926,223 B2
(45) Date of Patent: Feb. 23, 2021

(54) APPARATUS FOR SOLAR-ASSISTED WATER DISTILLATION USING WASTE HEAT OF AIR CONDITIONERS

(71) Applicant: Imam Abdulrahman Bin Faisal University, Dammam (SA)

(72) Inventor: Fahad G. Al-Amri, Dammam (SA)

(*) Notice: Subject to any disclaimer, the term of this patent is extended or adjusted under 35 U.S.C. 154(b) by 0 days.

(21) Appl. No.: 16/381,740

(22) Filed: Apr. 11, 2019

(65) Prior Publication Data
US 2020/0324248 A1 Oct. 15, 2020

(51) Int. Cl.
*B01D 61/36* (2006.01)
*H02S 40/44* (2014.01)
(Continued)

(52) U.S. Cl.
CPC ......... *B01D 61/364* (2013.01); *B01D 61/366* (2013.01); *C02F 1/447* (2013.01); *H02S 40/38* (2014.12); *H02S 40/44* (2014.12); *B01D 2311/103* (2013.01); *B01D 2311/106* (2013.01); *B01D 2313/18* (2013.01);
(Continued)

(58) Field of Classification Search
CPC .............. B01D 61/364; B01D 61/366; B01D 2311/103; B01D 2311/106; B01D 2313/18; B01D 2313/36; B01D 2313/38; C02F 1/447; C02F 2201/009; C02F 2303/10; C02F 2209/02; C02F 2209/40;
(Continued)

(56) References Cited

U.S. PATENT DOCUMENTS 3,299,651 A * 1/1967 McGrath ............ C02F 1/04
62/93
6,463,751 B1 10/2002 Teller
(Continued)

FOREIGN PATENT DOCUMENTS

DE 3123409 A1 * 12/1982 ............. B01D 61/36
EP 2 339 252 A1 6/2011
(Continued)

OTHER PUBLICATIONS

DE3123409A1_ENG (Espacenet machine translation of Gutbeir) (Year: 1982).*
(Continued)

*Primary Examiner* — Jonathan Miller
*Assistant Examiner* — Gabriel E Gitman
(74) *Attorney, Agent, or Firm* — Oblon, McClelland, Maier & Neustadt, L.L.P.

(57) ABSTRACT

An apparatus for water purification includes a membrane distillation (MD) cell; an air conditioner; a photovoltaic solar collector (PVSC) cell including a transparent photovoltaic cell configured to generate electricity, an absorber plate configured to absorb solar radiation, and a flow tube configured to receive the fluid; a first heat exchanger; a second heat exchanger; and a fluid source storing a fluid configured to circulate through the apparatus, wherein the fluid circulating in the apparatus carries heat generated by a condenser of the air conditioner to the PVSC cell where the fluid interacts with the PVSC cell to increase a temperature of the fluid to become a heated fluid; and the heated fluid circulates to the hot channel where the heated fluid drives the distillation of water in the MD cell.

15 Claims, 6 Drawing Sheets

(51) Int. Cl.
*H02S 40/38* (2014.01)
*C02F 1/44* (2006.01)
*C02F 103/08* (2006.01)

(52) U.S. Cl.
CPC ...... *B01D 2313/36* (2013.01); *B01D 2313/38* (2013.01); *C02F 2103/08* (2013.01); *C02F 2201/009* (2013.01); *C02F 2209/02* (2013.01); *C02F 2209/40* (2013.01); *C02F 2303/10* (2013.01); *F25B 2339/047* (2013.01)

(58) Field of Classification Search
CPC ............ C02F 2103/08; F25B 2339/047; H02S 40/38; H02S 40/44
See application file for complete search history.

(56) References Cited

U.S. PATENT DOCUMENTS

| | | | |
|---|---|---|---|
| 9,409,129 B2* | 8/2016 | Duke | B01D 61/368 |
| 2006/0218949 A1 | 10/2006 | Elils et al. | |
| 2010/0314238 A1* | 12/2010 | Frolov | B01D 3/343 |
| | | | 203/10 |
| 2012/0186623 A1* | 7/2012 | Bulovic | H01L 27/302 |
| | | | 136/244 |
| 2013/0019924 A1* | 1/2013 | Naughton | H01L 31/035227 |
| | | | 136/249 |
| 2018/0093905 A1* | 4/2018 | Bahar | C02F 1/10 |
| 2018/0212091 A1* | 7/2018 | Escarra | H01L 31/048 |

FOREIGN PATENT DOCUMENTS

| | | |
|---|---|---|
| EP | 2 906 331 B1 | 5/2017 |
| WO | 2014/163507 A1 | 10/2014 |

OTHER PUBLICATIONS

Rahbar et al., Performance enhancement and optimization of solar chimney power plant integrated with transparent photovoltaic cells and desalination method. Sustainable Cities and Society, 46, 101441 (Year: 2019).*

Diaby et al., Design study of the coupling of an air gap membrane distillation unit to an air conditioner. Desalination, 420, 308-317 (Year: 2017).*

Diaby, et al. ; Design study of the coupling of an air gap membrane distillation unit to an air conditioner ; Sesalination vol. 420, pp. 308-317 ; Oct. 2017 ; Abstract Only ; 4 Pages.

Mohan, et al. ; A novel solar thermal polygeneration system for sustainable production of cooling, clean water and domestic hot water in United Arab Emirates: Dynamic simulation and economic evaluation ; Applied Energy, vol. 167 ; pp. 173-188 ; Apr. 1, 2016 ; Abstract Only ; 5 Pages.

Traverse, et al. ; Emergence of highly transparent photovoltaics for distributed applications ; Nature Energy Review Article, vol. 2 ; pp. 849-860 ; Nov. 2017 ; 12 pages.

* cited by examiner

APPARATUS FOR SOLAR-ASSISTED WATER DISTILLATION USING WASTE HEAT OF AIR CONDITIONERS

BACKGROUND

Field of the Invention

The present disclosure generally relates to an apparatus for solar-assisted water distillation by a membrane distillation cell coupled to an air conditioning system.

Description of the Related Art

Global energy is dramatically growing due to surging population increases. A concomitant increase in demand for energy results from the desire for cooling and drinkable water. In regions where fresh water is not abundant, energy is further demanded to power desalination processes. In regions where cooling demands are high, air conditioning systems reject heat to the atmosphere as waste energy, which raises the temperature of the urban area causing the "Urban Temperature Island" phenomenon. This, in turn, increases the cost of cooling and reduces the performance of the air conditioners. The sheer quantity of air conditioners around the world generating this wasted thermal energy numbers in the millions. Thus, capturing and reusing this wasted thermal energy may help in meeting world energy requirements in a cost effective manner.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus for water purification, including a membrane distillation (MD) cell including a cold channel, a hot channel, and a membrane, and configured to distill water; an air conditioner, including a compressor, a condenser, an expansion valve, and an evaporator; a photovoltaic solar collector (PVSC) cell including a transparent photovoltaic cell configured to generate electricity, an absorber plate configured to absorb solar radiation, and a flow tube configured to receive the fluid; a first heat exchanger including a first fluid input and a second fluid input; a second heat exchanger including a first fluid input and a second fluid input; and a fluid source storing a fluid configured to circulate through the apparatus, wherein the fluid circulating in the apparatus carries heat generated by the condenser to the PVSC cell where the fluid interacts with the PVSC cell to increase a temperature of the fluid to become a heated fluid; and the heated fluid circulates to the hot channel where the heated fluid drives the distillation of water in the MD cell.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Air conditioning systems and absorption chiller cooling systems offer a means to lower temperatures of desired spaces, such as rooms and entire buildings. As compared to absorption chiller cooling systems, air conditioning systems offer myriad advantages. Firstly, air conditioners are more widely used and thus support for installation and maintenance is widely available. Secondly, air conditioners utilize substantially mechanical operation while absorption chiller cooling systems utilize thermo-chemical processes involving, for example, lithium bromide and water to establish a pressure gradient. Thirdly, absorption chiller cooling systems operate under vacuum, which may entail strict leak checks to sustain optimal performance. Fourthly, the general cost of production and maintenance is higher for absorption chiller cooling systems. Fifthly, absorption chiller cooling systems utilize large pumps which results in substantially more condenser water consumption due to evaporation, which is a critical issue worldwide.

A vapor compression air conditioning system may include four components: a compressor, condenser, expansion valve, and evaporator. In the condenser, the generated heat is transferred to the atmosphere as waste energy from the refrigerant. The condensing temperatures may operate between 40° C. to 70° C., which is a suitable range for membrane distillation applications as well. On the other hand, in the evaporator, the low evaporating temperatures allow considerable amounts of water vapor to be condensed, which is usually discarded entirely as waste when in actuality it is a non-trivial source of distilled water. To increase efficiency and cost of operation, the waste energy from the air conditioner may be captured and recycled to help operate another process requiring high temperature input. Also, the water-cooled system may result in an extended life span because of the efficiency of the medium and the lack of weather-exposed components. Moreover, such water-cooled systems may operate better at high temperature, which may offer advantages in regions with particularly high average ambient temperatures, such as desert regions. Thus, an apparatus is desired that couples the air conditioner with a membrane distillation system, wherein water instead of air may be used to remove heat from the condenser. As a result, the water is heated after cooling the condenser, which may be circulated to a photovoltaic solar collector for additional heating in order to efficiently drive the distillation of water in the membrane distillation system.

Figure 1:
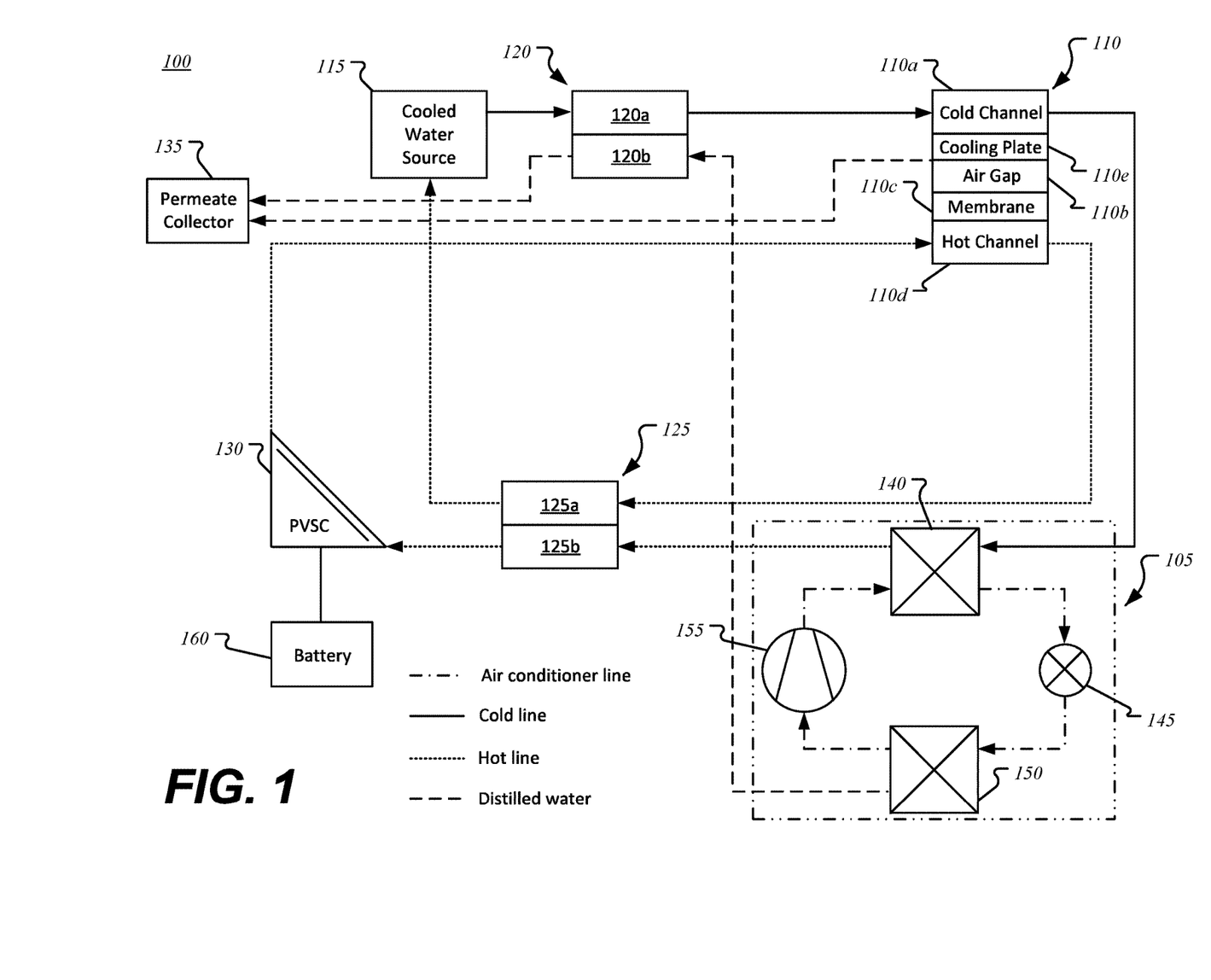
FIG. 1 is a block diagram of a solar-assisted air gap membrane distillation apparatus, according to an exemplary aspect of the present disclosure.

FIG. 1 illustrates a block diagram of a solar-assisted air gap membrane distillation apparatus 100, according to an exemplary aspect of the present disclosure. In an exemplary aspect, the solar-assisted air gap membrane distillation (SAAGMD) apparatus 100 may include an air conditioner 105, an AGMD cell 110, a cooled water source 115, a first heat exchanger 120, a second heat exchanger 125, a photovoltaic (PV) solar collector (SC) cell 130, and a permeate collector 135. The air conditioner 105 may include a condenser 140, an expansion valve 145, an evaporator 150, and a compressor 155. The air conditioner 105 may utilize a vapor compression refrigeration system, wherein a refrigerant may be circulated through the air conditioner 105. The air conditioner 105 may operate according to known methods by those in the art, but a brief description is provided. The condenser 140 may be fluidly connected to the expansion valve 145, which is in turn fluidly connected to the evaporator 150, which is in turn fluidly connected to the compressor 155, which is finally fluidly connected back to the condenser 140, forming the circulation loop. The refrigerant may be configured to circulate to the aforementioned components in that order, or as shown in FIG. 1 as a non-limiting example, in a clockwise direction. The air conditioner 105 may be configured to cool a gas, such as air, and expel the cooled air in order to reduce the temperature of a predetermined space, such as a building. Notably, in cooling the gas, heat must be produced, and said heat is expelled away from the cooled air. This occurs as follows: the refrigerant in a gaseous state in the evaporator 150 circulates from the evaporator 150 to the compressor 155, where the gaseous refrigerant is compressed. The compressed refrigerant is circulated to the condenser 140, where it is condensed to a liquid state, resulting in a release of heat. The liquid refrigerant then circulates to the expansion valve 145 where pressure on the liquid refrigerant is reduced and the liquid refrigerant is released to the evaporator 150 according to a predetermined flow rate. The evaporator 150 may convert the liquid refrigerant to a vapor state, wherein as the liquid refrigerant reaches and circulates through the evaporator 150 as a cooled fluid (liquid), it absorbs heat from warm air (e.g. from the building) and reaches its low boiling point rapidly. The refrigerant then boils and vaporizes into the gaseous state, absorbing the maximum amount of heat from the warm air turning it into cooled air, which is then directed back (e.g. back into the building). The process repeats, wherein the gaseous refrigerant is circulated to the compressor 155 again. Notably, the cooling of the warm air to cooled air may result in water condensation occurring in the evaporator, which may be collected as distilled water.

As mentioned above, the main source of heat generation from the air conditioner 105 occurs at the condenser 140. In some aspects, the heat may be dissipated from the condenser 140 via a fan blowing on a heat drawing component of the condenser 140, such as a heat sink or a plurality of heat pipes. In an exemplary aspect, the heat drawing component of the condenser 140 may be encapsulated in a housing configured to receive a cooled liquid, flow said cooled liquid over the heat drawing component to absorb the generated heat, and expel the cooled fluid from the condenser 140 as a heated fluid. The fluid connection to the other components in the SAAGMD apparatus 100 is described as follows.

The first heat exchanger 120 may include a first fluid input 120a and a second fluid input 120b. The cooled water source 115 may be fluidly connected to the first fluid input 120a of the first heat exchanger 120.

The AGMD cell 110 may include a cold channel 110a, an air gap 110b, a membrane 110c, a hot channel 110d, and a cooling plate 110e. The first fluid input 120a may be fluidly connected to the cold channel 110a of the AGMD cell 110. The cold channel 110a may be fluidly connected to the condenser 140, for example to the housing encapsulating the heat drawing component of the condenser 140.

The second heat exchanger 125 may include a first fluid input 125a and a second fluid input 125b. The condenser 140 may be fluidly connected to the first fluid input 125a of the second heat exchanger 125. The first fluid input 125a may be fluidly connected to the PVSC cell 130.

The PVSC cell 130 may be fluidly connected to the hot channel 110d of the AGMD cell 110. The hot channel 110d may be fluidly connected to the second fluid input 125b of the second heat exchanger 125. The second fluid input 125b of the second heat exchanger 125 may be fluidly connected to the cooled water source 115.

In another embodiment of the invention the fluid source is fluidly connected to the first fluid input of the first heat exchanger, the first fluid input of the first heat exchanger is fluidly connected to the cold channel of the MD cell, the cold channel of the MD cell is fluidly connected to the condenser, the condenser is fluidly connected to the first fluid input of the second heat exchanger, the first fluid input of the second heat exchanger is fluidly connected to the PVSC cell, the PVSC cell is fluidly connected to the hot channel of the MD cell, the hot channel of the MD cell is fluidly connected to the second fluid input of the second heat exchanger, the second fluid input of the second heat exchanger is fluidly connected to the fluid source, and the evaporator is fluidly connected to the second fluid input of the first heat exchanger.

Additionally, as mentioned previously, distilled water may be produced by the air conditioner 105 at the evaporator 150. The evaporator 150 may be fluidly connected to the second fluid input 120b of the first heat exchanger 120. The distilled water may be flowed through the second input 120b before being collected in the permeate collector 135.

The AGMD cell 110 may be configured to produce distilled water via a thermally driven membrane separation process wherein water vapor molecules permeate through hydrophobic membranes (e.g. membrane 110c). The temperature difference of the fluid (containing water) being flowed into the cold channel 110a and the hot channel 110d may induce a vapor pressure difference across the membrane 110c, thereby providing the driving force for the water vapor diffusion. Membrane distillation in general has many advantages, including low operating temperature and hydraulic pressure, high rejection of solutes, performance independence of high osmotic pressure, and lower mechanical property thresholds on the membrane 110c. While the exemplary aspect utilizes the AGMD cell 110, it may be appreciated by those in the art that other types of membrane distillation may be used. Non-limiting examples of other membrane distillation cells include at least one of direct contact membrane distillation (DCMD), vacuum membrane distillation (VIVID), and sweeping gas membrane distillation (SGMD).

In the exemplary aspect, in the AGMD cell 110, the membrane 110c may be disposed adjacent to the hot channel 110d on a first side of the membrane 110c. On a second side of the membrane 110c, the air gap 110b may be disposed. Adjacent to the air gap 110b may be disposed the cooling plate 110e. Finally, the cold channel 110a may be disposed adjacent to the cooling plate 110e. The cold channel 110a may be configured to receive a cold fluid, such as cold water or salt water, that is lower in temperature than the hot channel 110d, which may also be configured to receive a hot fluid, such as hot water or salt water. For the remainder of the description, the term "water" may be used but understood to mean any fluid containing water content. The temperature difference between the water in the cold channel 110a and the hot channel 110d may induce the aforementioned effect of producing distilled water. In the AGMD cell 110, water may evaporate at the hot channel 110d to travel through the pores of the membrane 110c and across the air gap 110b to the cooling plate 110e. The water vapor may condense on the cooling plate 110e and be collected in the permeate collector 135. Notably, water supplied may be from the cooled water source 115, which may include impurities. For example, the water from the cooled water source 115 may be sea or ocean water including salts. However, the impurities may not evaporate with the water at the hot channel 110d and thus distilled water is collected from the cooling plate 110e. Advantageously, the use of the AGMD cell 110 as compared to, for example a DCMD cell, allows for the use of any coolant flowed through the cold channel 110a since it does not mix with the condensate. Moreover, the AGMD cell 110 has a high thermal efficiency due to insulation via the air gap 110b between the cold channel 110a and the hot channel 110d. That is, heat loss by conduction is minimized. For maintenance considerations, the AGMD cell 110 may allow for easy repair of membrane leakage or membrane replacement, wherein the AGMD cell 110 may prevent contamination of the collected condensate.

The performance of the AGMD cell 110 may be given by a gain output ratio (GOR), which may be expressed as:

$$GOR = \frac{J_W H_W}{\dot{m} C_p (T_{in} - T_{out})} * \text{Membrane Area}$$

where Jw is the rate of permeate production, Hw is the enthalphy of vaporization in (kJ/kg), $\dot{m}$ is the mass flow rate of the water, Cp is the specific heat capacity of the water, and $T_{in}$ and $T_{out}$ are the temperature of the hot channel 110d and cold channel 110a, respectively. A higher value of GOR corresponds to lower thermal energy consumption per unit mass of distillate. A value of 1 corresponds to a system with no losses and no condensation energy recovery. Thus, as MD is driven by vapor pressures, the rate of permeate production is affected greatly by the temperature difference. To increase the temperature difference, waste heat from the air conditioner 105 may be recovered and flowed to the PVSC cell 130 via the first fluid input 125a.

Figure 2A:
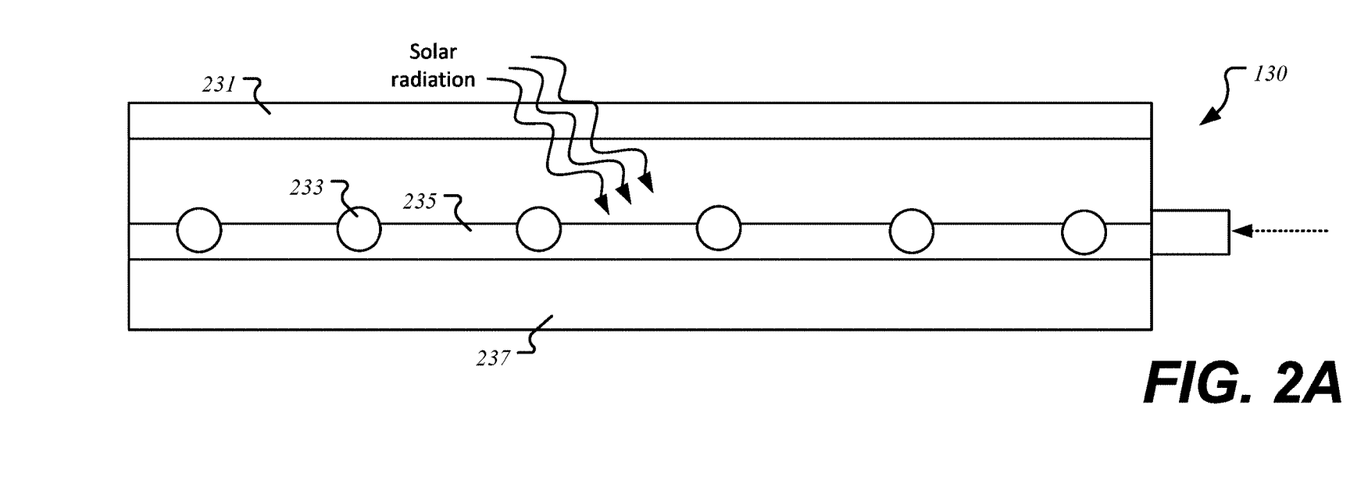
FIG. 2A is a cross-sectional view schematic of a photovoltaic solar collector, according to an exemplary aspect of the present disclosure.
Figure 2B:
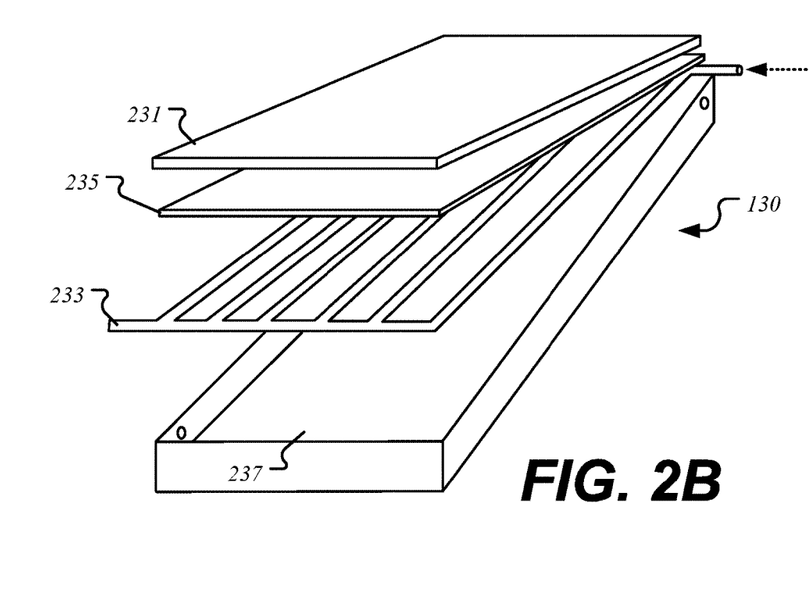
FIG. 2B is a perspective view schematic of a photovoltaic solar collector, according to an exemplary aspect of the present disclosure.

FIG. 2A illustrates a cross-sectional diagram of the PVSC cell 130, and FIG. 2B illustrates a perspective-view diagram of the PVSC cell 130, according to an exemplary aspect of the present disclosure. The PVSC cell 130 may include a transparent photovoltaic 231, a flow tube 233, an absorber plate 235, and insulation 237. The PVSC cell 130 may be configured to generate electrical energy and thermal energy simultaneously. A part of the PVSC cell 130, such as the absorber plate 235, may be configured to capture solar radiation to heat a liquid, such as the water. In an exemplary aspect, the PVSC cell 130 may receive the water at an input of the flow tube 233 from the condenser 140 via the first fluid input 125a, and heat the water by absorbing the solar radiation as heat into the absorber plate 235 and transferring the heat to the water flowing in the flow tube 233. The flow tube 233 may be partially or entirely embedded in the absorber plate 235 to increase the amount of surface area in contact between the absorber plate 235 and the flow tube 233. The flow tube 233 may be structured to be a series of branched channels, also known as a harp configuration (as shown), or a serpentine pattern winding through the absorber plate 235. The PVSC cell 130 may also generate electricity from the solar radiation via the photovoltaic effect. Notably, the transparent photovoltaic 231 may form the upper transparent cover of the PVSC cell 130 (directed towards the direction of received solar radiation) and be configured to generate electricity from the solar radiation. Moreover, the transparent photovoltaic 231 may be configured to then allow at least a portion of the solar radiation not absorbed by the transparent photovoltaic 231 to transmit through to the absorber plate 235. Advantageously, where a regular glass cover would only serve to transmit and trap the solar radiation in the PVSC cell 130, the transparent photovoltaic 231 serves a dual function of transmitting and trapping solar radiation as heat (since it's transparent it still allows solar radiation through and may contribute to a "greenhouse effect") as well as producing electricity from the solar radiation. The insulation 237 may be an insulating material configured to prevent heat transfer through the side of the PVSC cell 130 opposite the absorber plate 235. The transparent photovoltaic 231 may be a transparent solar cell, a luminescent solar concentrator (LSC), or a scattering solar concentrator, or any combination thereof. For example, the transparent photovoltaic 231 may be a wavelength selective, thin film photovoltaic cell. In such an example, the transparent photovoltaic 231 may be configured to absorb a predetermined range of wavelengths of solar radiation. For example, the transparent photovoltaic 231 may be configured to absorb wavelengths in the range spanning the ultraviolet (UV) to near infrared (NIR) range. This range of wavelengths may otherwise be unused by the solar collector for heating the water. Other non-limiting examples of types of transparent photovoltaic 231 include at least one of a non-wavelength selective, spatially segmented transparent solar cell, a non-wavelength selective, thin film photovoltaic cell, a non-wavelength-selective and colorful LSC, a non-wavelength-selective scattering concentrator, and a wavelength-selective transparent LSC.

The PVSC cell 130 may be connected to a battery 160, wherein the battery 160 is configured to store electrical energy generated by the PVSC cell 130 and used to provide power to other components that may use the power when solar radiation is absent. For example, when an intensity of the solar radiation is below a predetermined threshold, the PVSC cell 130 may not heat the water sufficiently prior to reaching the hot channel 110d. In such a case, a fluid heater may be connected to the battery 160 and used to heat the water before the water flows to the hot channel 110d. In one aspect, the PVSC cell 130 may include a fluid heater. For example, the stored charge in the battery could heat the absorber plate 235 in order to increase the temperature of the water flowing through the flow tube 233. This allows the water to maintain a high enough temperature to facilitate the distillation of water in the AGMD cell 110 even during periods of low solar radiation intensity, such as on cloudy days or at night.

The first and second heat exchangers 120,125 may be configured to facilitate heat transfer between the fluid entering through the first fluid input 120a,125a and the second fluid input 120b, 125b. Heat exchanger types and method of function are generally known by those in the art. For example, the heat exchangers 120,125 may be a shell and tube heat exchanger, a plate heat exchanger, a plate and shell heat exchanger, or a plate fin heat exchanger.

The cooled water source 115 may be a reservoir of water for providing sufficient cooling to the SAAGMD apparatus 100 via the fluid contained within. For example, the cooled water source 115 may be a large tank of cold water or a direct line of water sourced from the ocean. Similarly, water returning from the AGMD cell 110 may be deposited in the cooled water source 115. For an aspect wherein the fluid is water with a salt content, the salt water leaving the hot channel 110d may have an increased salt content due to water vaporization inside the AGMD cell 110. Thus, the cooled water source 115 may include a detector to determine a salt content of the cooled water source 115 and stop the SAAGMD apparatus 100 if the salt content of the cooled water source 115 exceeds a predetermined threshold. In another aspect, the sea water leaving the hot channel 110d may flow out to the ocean and a detector may not be included.

An implementation of an exemplary aspect of the SAAGMD apparatus 100 is as follows. As previously mentioned, heat is produced by the condenser 140 and cold, distilled water is produced by the evaporator 150 in the air conditioner 105. Water, such as sea water, flows from the cooled water source 115 to the first fluid input 120a of the first heat exchanger 120 where it is cooled by the cold, distilled water flowed into the second fluid input 120b of the first heat exchanger 120. The cooled water exits the first fluid input 120a of the first heat exchanger 120 and flows to the cold channel 110a of the AGMD cell 110. The cooled water provides the low temperature feed for the AGMD cell 110 to produce distilled water. The cooled water cools the cooling plate 110e, thereby inducing condensation on said cooling plate 110e. The condensate (distilled water) flows to the permeate collector 135. The water exiting the cold channel 110a exits at a higher temperature than when it entered. The water then flows to the condenser 140, where it cools the heat drawing component of the condenser 140. The water exiting the condenser 140 exits at a higher temperature than when it entered. The water then flows to the first fluid input 125a of the second heat exchanger 125, where it is heated by the water entering the second fluid input 125b of the second heat exchanger 125. The water exiting the first fluid input 125a of the second heat exchanger 125 exits at a higher temperature than when it entered. The water then flows to the PVSC cell 130 where it is further heated. The heated water then flows to the hot channel 110d of the AGMD cell 110. The heated water provides the high temperature feed for the AGMD cell 110 to produce distilled water. The heated water provides the energy for vaporizing the water such that the water vapor travels through the membrane 110c and across the air gap 110b before condensing on the cooling plate 110e. The water exiting the hot channel 110d exits at a lower temperature than when it entered. The water then flows to the second fluid input 125b of the second heat exchanger 125 where it heats the water entering the first fluid input 125a of the second heat exchanger 125. The water exiting the second fluid input 125b of the second heat exchanger exits at a lower temperature than when it entered. The water may then flow to the cooled water source 115 where it mixes with the volume of water contained within. Water distilled via the AGMD cell 110 may also be collected in the permeate collector 135.

Figure 3:
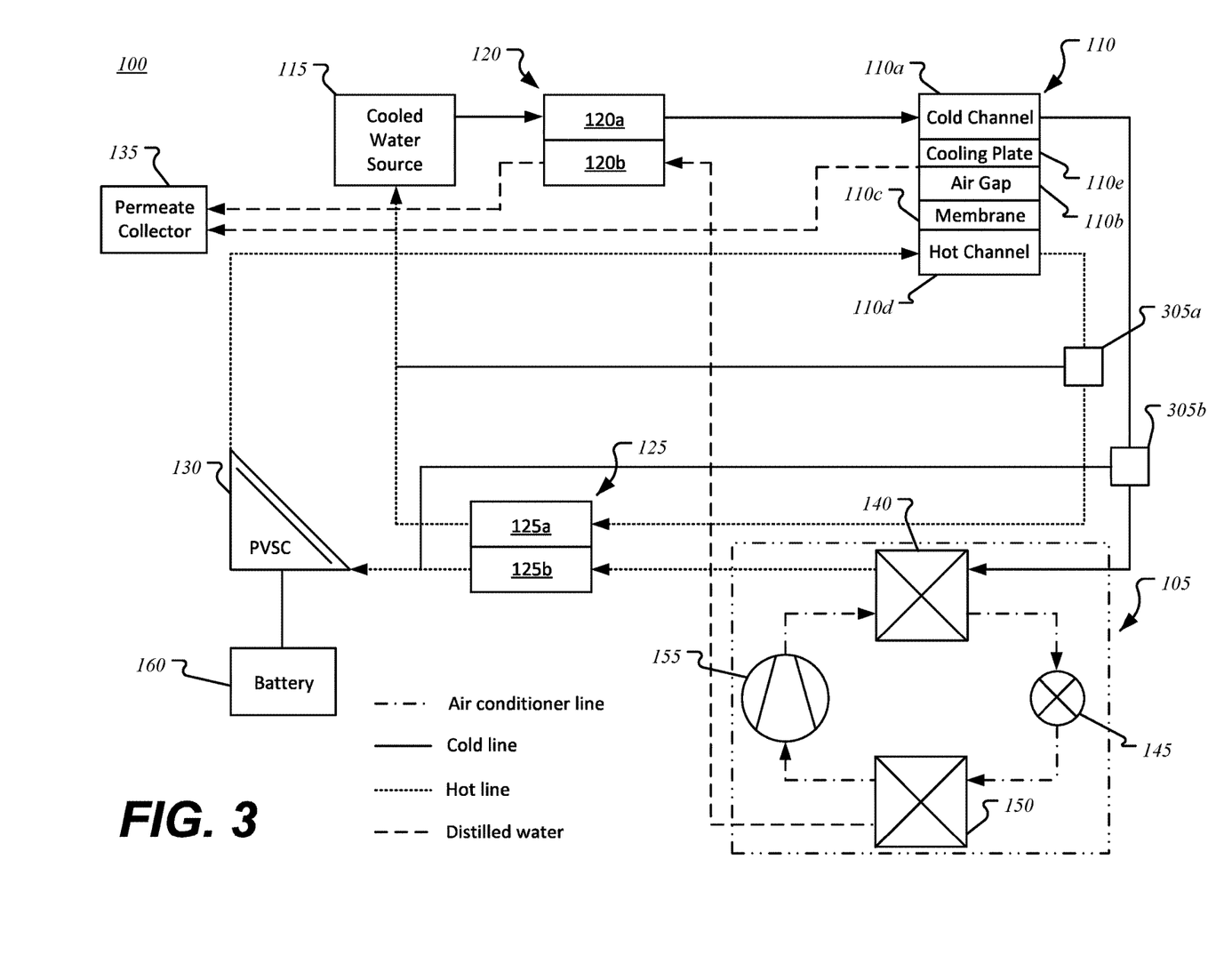
FIG. 3 is a block diagram of a solar-assisted air gap membrane distillation apparatus with bypass valves, according to an exemplary aspect of the present disclosure.

In one aspect, a first differential thermostatic control valve (DTCV) 305a and a second DTCV 305b may be included in the SAAGMD apparatus 100 to allow bypass around certain components. FIG. 3 illustrates a block diagram of the SAAGMD apparatus 100 with flow bypass, according to an aspect of the present disclosure. The SAAGMD apparatus 100 may include a plurality of temperature sensors configured to read a temperature of the fluid at various predetermined locations in the fluid circulation loop of the SAAGMD apparatus 100. The first DTCV 305a may detect a temperature difference between water leaving the hot channel 110d and the water leaving the condenser 140. When the water leaving the hot channel 110d is colder than the water leaving the condenser 140, the first DTCV 305a may redirect the flow of water from the hot channel 110d to the cooled water source 115. This may prevent the water leaving the hot channel 110d from cooling the water leaving the condenser 140 via the second heat exchanger 125, which would decrease the efficiency of the AGMD cell 110. The second DTCV 305b may detect the temperature difference between the water leaving the cold channel 110a and the temperature of the water exiting the compressor 155. When the air conditioner 105 is not in operation or when the water leaving the cold channel 110a is warmer, for example 3-5° F. warmer, than the temperature of the water exiting condenser 140, the DTCV 305b may redirect the water flow to the PVSC cell 130 and bypass the condenser 140. Therefore, the PVSC cell 130 may operate as the primary source of heating for the water flowing to the hot channel 110*d* and the electricity for the whole SAAGMD apparatus 100.

Figure 4:
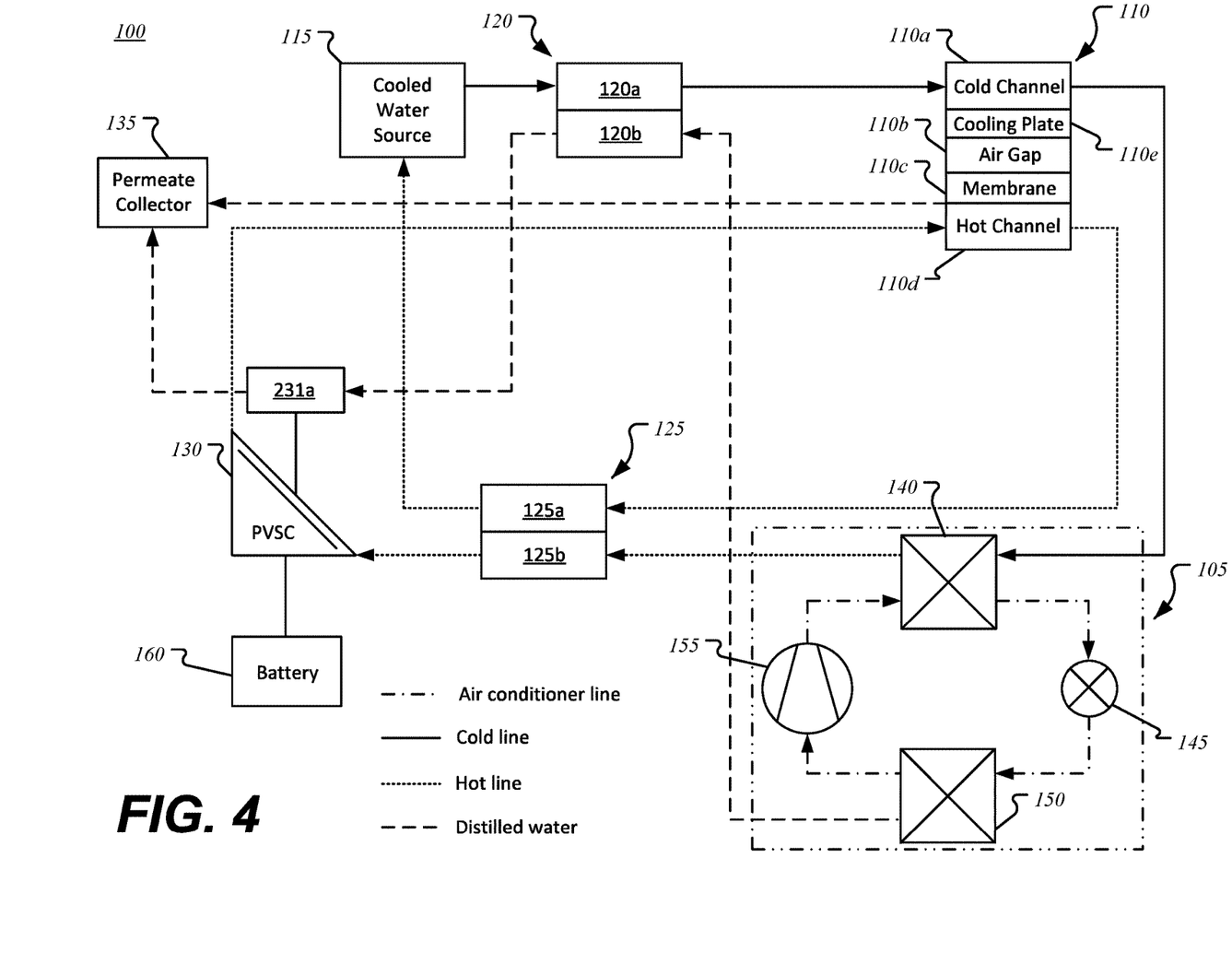
FIG. 4 is a block diagram of a solar-assisted air gap membrane distillation apparatus with cooling for a transparent photovoltaic, according to an aspect of the present disclosure.

FIG. 4 illustrates a block diagram of the SAAGMD apparatus 100 with cooling for the transparent photovoltaic 231, according to an aspect of the present disclosure. In one aspect, a decline in efficiency of photovoltaic cells results from an increase in operating temperature. The transparent photovoltaic 231 may include a cooling device 231*a* in order to reduce the operating temperature of the transparent photovoltaic 231, which is in close proximity to the absorbing plate 235. For example, the cooling device 231*a* may be a series of heat fins embedded in the transparent photovoltaic 231 configured to absorb heat and carry the heat to a heat drawing structure where it may be cooled by the cooling device 231*a*. In another example, the cooling device 231*a* may be a series of fluid pipes embedded in the transparent photovoltaic 231 configured to flow a fluid through the fluid pipes, wherein the fluid absorbs heat via conduction and transports the heat out of the vicinity of the transparent photovoltaic 231. The cooling device may be configured to receive fluid from the second fluid input 120*b* of the first heat exchanger 120, wherein the fluid received may reduce the temperature of the transparent photovoltaic 231. As previously mentioned, the fluid may wick heat from a heat drawing structure attached to the transparent photovoltaic 231, directly from the transparent photovoltaic 231, or any combination thereof. The water received from the second fluid input 120*b* of the first heat exchanger 120 is preferably lower in temperature than the operating temperature of the transparent photovoltaic 231 in order to cool the transparent photovoltaic 231 and increase its efficiency. As described above, a plurality of temperature sensors may be included to measure the temperature of the fluid exiting the second fluid input 120*b* of the first heat exchanger 120 and the operating temperature of the transparent photovoltaic 231, and in response to determining the operating temperature of the transparent photovoltaic 231 is lower than the temperature of the fluid exiting the second fluid input 120*b* of the first heat exchanger 120, the fluid may be redirected to bypass the cooling device 231*a* and into the permeate collector 135.

Figure 5A:
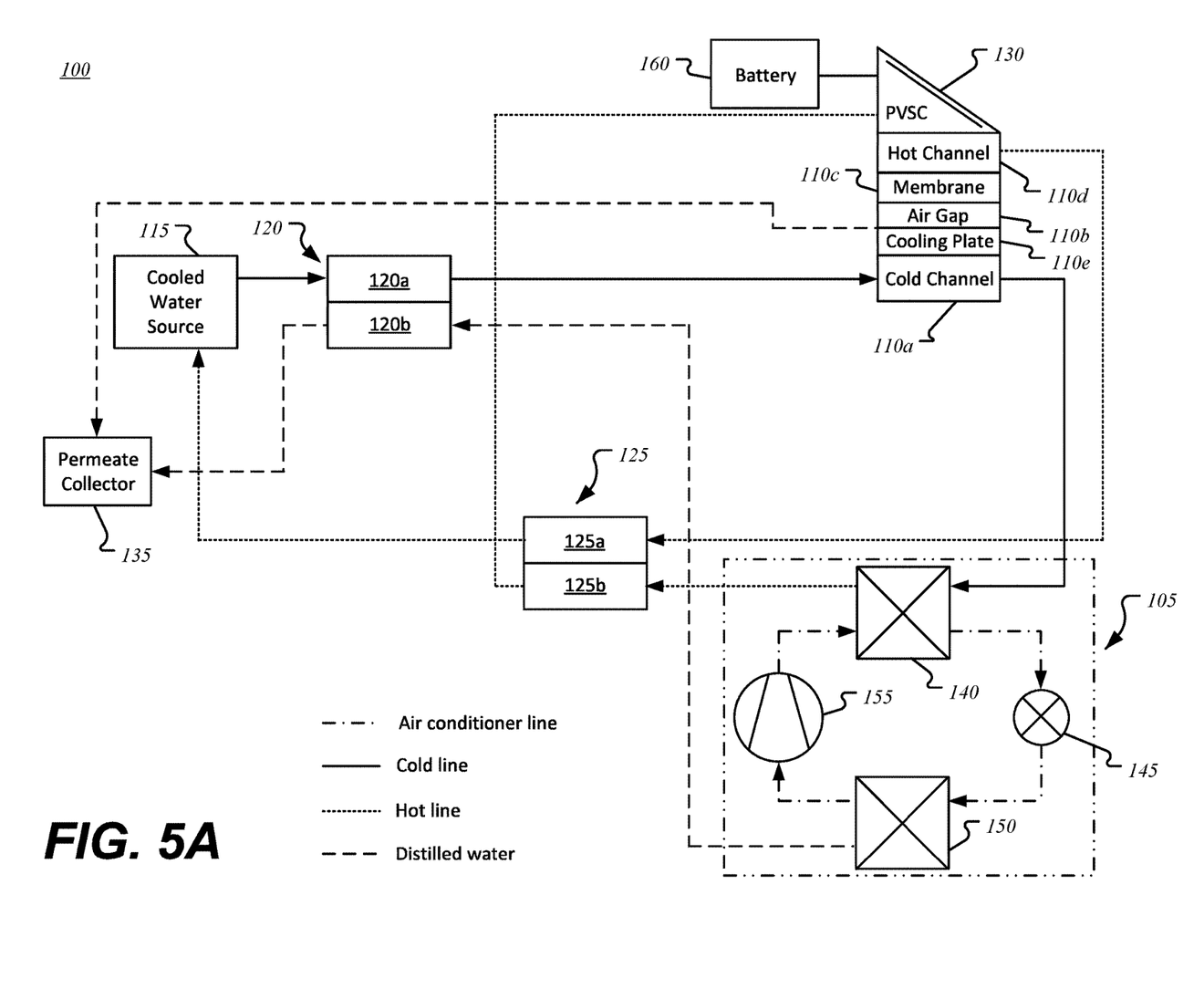
FIG. 5A is a block diagram of the solar-assisted air gap membrane distillation apparatus with an integrated photovoltaic solar cell and air gap membrane distillation cell, according to an aspect of the present disclosure.
Figure 5B:
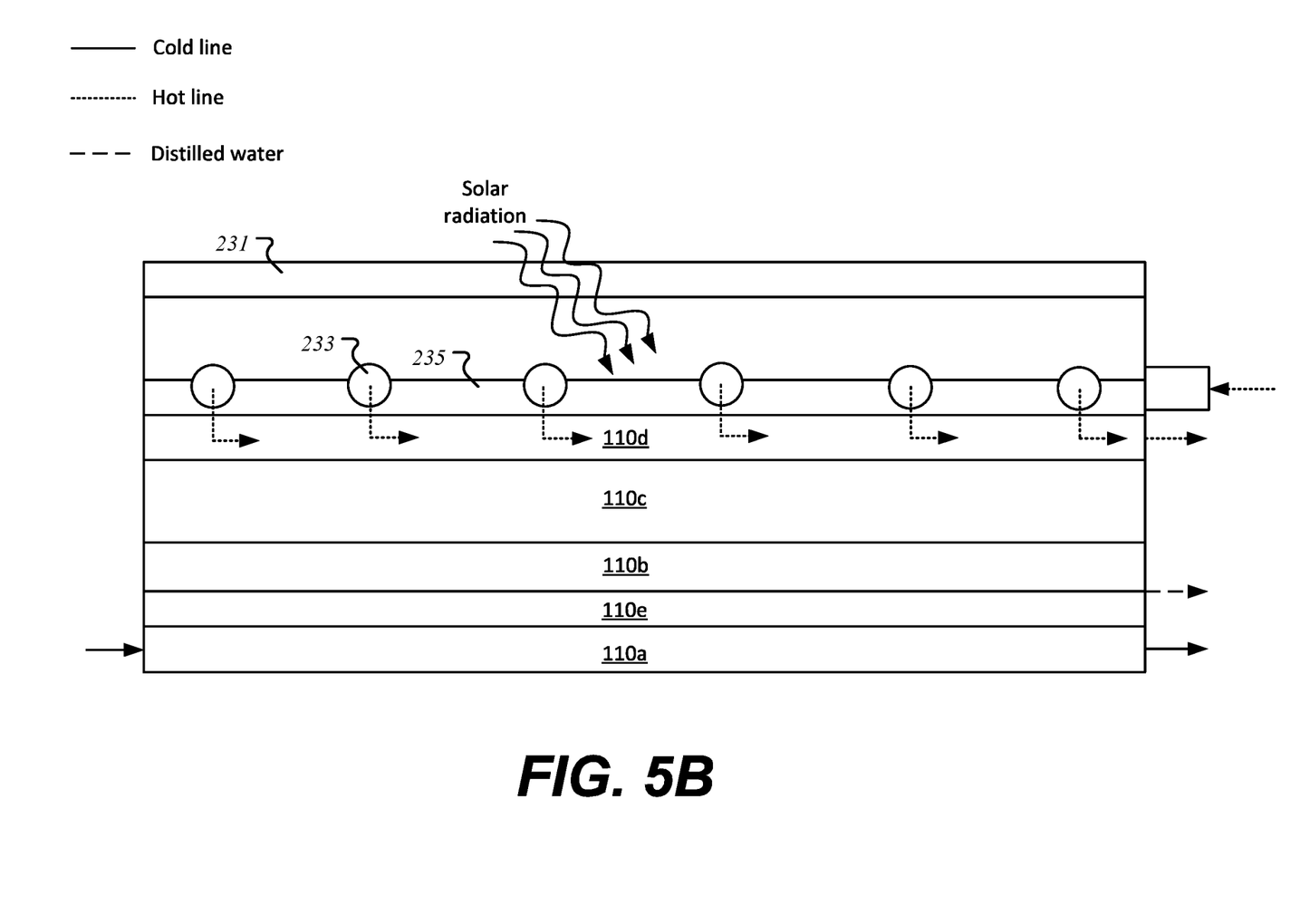
FIG. 5B is a cross-sectional diagram of a solar-assisted air gap membrane distillation apparatus with an integrated photovoltaic solar cell and air gap membrane distillation cell, according to an aspect of the present disclosure.

FIG. 5A illustrates a block diagram of the SAAGMD apparatus 100 with an integrated PVSC 130 and AGMD 110, and FIG. 5B illustrates a cross-sectional diagram of the SAAGMD apparatus 100 with an integrated PVSC 130 and AGMD 110, according to an aspect of the present disclosure. In one aspect, the PVSC 130 may be integrated into the AGMD 110, wherein the absorber plate 235 comprises a part of the housing of the AGMD 110 adjacent to the hot channel 110*d*. Due to efficiency increasing in the AGMD 110 as the difference between the temperature of the fluid entering the cold channel 110 and hot channel 110*d* increases, the temperature of the fluid in the hot channel 110*d* may be increased. The absorber plate 235 may be disposed adjacent to the hot channel 110*d*, wherein fluid is configured to flow through the flow tube 233 and subsequently directed to the hot channel 110*d*. The fluid flowing through the hot channel 110*d* may be in thermal contact with the absorber plate 235 such that the absorber plate 235 conductively transfers heat to the fluid. Thus, this may allow the absorber plate 235 to heat the fluid in an additional manner. That is, the fluid is first heated by the absorber plate 235 as it flows through the flow tube 233. Then, the fluid flows into the hot channel 110*d* where a side of the absorber plate 235 adjacent to the hot channel 110*d* conductively transfers heat again to the fluid flowing through the hot channel 110*d*. The flow tube 233 may be structured in a harp configuration, wherein each branch of the flow tube 233 is fluidly connected to the hot channel 110*d* (as shown), or in a serpentine pattern, wherein a single output end of the flow tube 233 is fluidly connected to the hot channel 110*d* (not shown). The fluid may flow from a first end of the PVSC 130 and AGMD 110 integrated structure to a second end via the flow tube 233, and subsequently back to the first end via the hot channel 110*d* in order to maximize the amount of heat conductively transferred from the absorber plate 235 to the fluid.

Notably, as described above in various aspects, the heated water may exit the PVSC cell 130 and flow to the hot channel 110*d* of the AGMD cell 110 where the heated water may provide a higher $T_{in}$ in order to increase the GOR of the AGMD cell 110 (as compared to heated water sourced directly from the condenser 140). Additionally, the cold distilled water from the evaporator 150 may further cool the water flowing to the cold channel 110*a* (via the first heat exchanger 120) in order to provide a lower $T_{out}$ in order to increase the GOR of the AGMD cell 110 (as compared to heated water sourced directly from the cooled water source 115). Advantageously, the waste heat generated by the condenser 140 is not released to the environment, but rather, is reclaimed and utilized to not only power the distillation of water in the AGMD cell 110, but also increase its efficiency. In another advantage over other solar collectors, the PVSC cell 130 is able to simultaneously generate electricity via the transparent photovoltaic window while further increasing the efficiency of the AGMD cell 110 by converting solar radiation into heat energy of water flowed through the PVSC cell 130. This may heat the water to a temperature between, for example, 40-80° C., or 35-100° C., or 30-120° C., which may be sufficient thermal energy for the AGMD cell 110 to operate. Moreover, the transparent photovoltaic may utilize the wavelengths of solar radiation between the UV and NIR to generate electricity, wavelengths that would otherwise be substantially unused in generating heat for the water. This electricity may be used for myriad applications, including, but not limited to, supporting the operation of the SAAGMD apparatus 100 during periods of no sunlight, heating water to allow operation of the AGMD cell 110 during periods where the air conditioner 105 may not be operating, and powering various appliances that may be connected to the battery 160. Another significant advantage of the SAAGMD apparatus 100 is efficiently producing distilled, potable water in regions where it may be scarce but abundant in sunlight, such as the desert.

A number of aspects have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary aspects of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. An apparatus for water purification, comprising:
a membrane distillation (MD) cell including a cold channel, a hot channel, and a membrane, and configured to distill water;
an air conditioner, including a compressor, a condenser, an expansion valve, and an evaporator;
a photovoltaic solar collector (PVSC) cell including a transparent photovoltaic cell configured to generate electricity, an absorber plate configured to absorb solar radiation, and a flow tube configured to receive the fluid;
a first heat exchanger including a first fluid input and a second fluid input;
a second heat exchanger including a first fluid input and a second fluid input; and
a fluid source storing a fluid, the fluid source configured to circulate the fluid through the apparatus, wherein
the fluid circulating in the apparatus carries heat generated by the condenser to the PVSC cell where the fluid interacts with the PVSC cell to increase a temperature of the fluid to become a heated fluid; and
the heated fluid circulates to the hot channel where the heated fluid drives the distillation of water in the MD cell,
wherein the fluid source is fluidly connected to the first fluid input of the first heat exchanger, the first fluid input of the first heat exchanger is fluidly connected to the cold channel of the MD cell, the cold channel of the MD cell is fluidly connected to the condenser, the condenser is fluidly connected to the second fluid input of the second heat exchanger, the second fluid input of the second heat exchanger is fluidly connected to the PVSC cell, the PVSC cell is fluidly connected to the hot channel of the MD cell, the hot channel of the MD cell is fluidly connected to the first fluid input of the second heat exchanger, the first fluid input of the second heat exchanger is fluidly connected to the fluid source, and the evaporator is fluidly connected to the second fluid input of the first heat exchanger.

2. The apparatus of claim 1, wherein
the MD cell is an air gap membrane distillation (AGMD) cell;
the AGMD cell includes an air gap disposed between the membrane and the cold channel; and
the AGMD cell includes a cooling plate disposed between the air gap and the cold channel.

3. The apparatus of claim 1, wherein
the transparent photovoltaic cell forms the upper cover of the PVSC cell; and
the flow tube is in thermal contact with the absorber plate and configured to absorb heat transferred from the absorber plate.

4. The apparatus of claim 3, wherein the PVSC cell further includes insulation configured to prevent heat escape from the PVSC cell.

5. The apparatus of claim 1, further comprising:
a permeate collector, wherein,
the evaporator generates a distilled water; and
the distilled water generated by the MD cell and the evaporator is collected in the permeate collector.

6. The apparatus of claim 1, further comprising:
a battery electrically connected to the PVSC cell and configured to store a charge generated by the transparent photovoltaic cell of the PVSC cell.

7. The apparatus of claim 5, wherein
the distilled water generated by the evaporator is circulated to the second fluid input of the first heat exchanger;
the distilled water entering the second fluid input of the first heat exchanger is a lower temperature than the fluid entering the first fluid input of the first heat exchanger; and
the distilled water entering the second fluid input of the first heat exchanger cools the fluid entering the first fluid input of the first heat exchanger.

8. The apparatus of claim 6, wherein
in response to an intensity of solar radiation being below a predetermined threshold,
the stored charge in the battery is used to heat a fluid heater electrically connected to the battery and the fluid is circulated through the fluid heater prior to circulating to the hot channel.

9. The apparatus of claim 1, wherein the fluid is sea water.

10. The apparatus of claim 1, further comprising:
a first thermostatic control valve; and
a second thermostatic control valve, wherein
the first thermostatic control valve and second thermostatic control valve are configured to redirect flow of the fluid around (i) the second heat exchanger and into the fluid source or (ii) the condenser and into the PVSC cell.

11. The apparatus of claim 10, wherein
in response to determining that a temperature of the fluid exiting the hot channel is lower than a temperature of the fluid exiting the condenser,
the first thermostatic control valve redirects the flow of the fluid passed the second heat exchanger and into the fluid source.

12. The apparatus of claim 10, wherein
in response to determining a temperature of the fluid exiting the cold channel is higher than a temperature of the fluid exiting the condenser,
the second thermostatic control valve redirects the flow of the fluid passed the condenser and into the PVSC cell.

13. The apparatus of claim 1, wherein
the PVSC cell is coupled to the MD cell;
the absorber plate comprises a side of a housing of the MD cell adjacent to the hot channel; and
an output of the flow tube is fluidly connected to the hot channel.

14. The apparatus of claim 13, wherein
the fluid is configured to flow through an input of the flow tube and exit via the output of the flow tube;
the hot channel is configured to receive the fluid exiting from the output of the flow tube;
the fluid is configured to flow through the hot channel;
the absorber plate is in thermal connection with the fluid flowing through the hot channel; and
the absorber plate is configured to heat the fluid flowing through the flow tube and the hot channel.

15. The apparatus of claim 1, wherein the PVSC cell heats the fluid to a temperature between 35° C. to 100° C.

* * * * *